(12) United States Patent
Saavedra

(10) Patent No.: US 8,913,610 B2
(45) Date of Patent: *Dec. 16, 2014

(54) SYSTEM, APPARATUS AND METHOD FOR PROVIDING AGGREGATED NETWORK CONNECTIONS

(75) Inventor: Patricio Humberto Saavedra, Toronto (CA)

(73) Assignee: Teloip Inc., Mississauga, Ontario (CA)

( * ) Notice: Subject to any disclaimer, the term of this patent is extended or adjusted under 35 U.S.C. 154(b) by 92 days.

This patent is subject to a terminal disclaimer.

(21) Appl. No.: 13/420,938

(22) Filed: Mar. 15, 2012

(65) Prior Publication Data

US 2013/0064255 A1    Mar. 14, 2013

Related U.S. Application Data

(63) Continuation of application No. 12/269,439, filed on Nov. 12, 2008, now Pat. No. 8,155,158.

(51) Int. Cl.
| | | |
|---|---|---|
| *H04L 12/28* | (2006.01) | |
| *H04L 12/709* | (2013.01) | |
| *H04L 29/06* | (2006.01) | |
| *H04J 1/16* | (2006.01) | |
| *H04L 12/70* | (2013.01) | |

(52) U.S. Cl.
CPC .......... *H04L 12/2867* (2013.01); *H04L 45/245* (2013.01); *H04L 69/14* (2013.01); *H04L 2012/5624* (2013.01); *Y02B 60/33* (2013.01)
USPC ............................ 370/389; 370/252; 370/238

(58) Field of Classification Search
USPC ......................................... 370/252, 238, 389
See application file for complete search history.

(56) References Cited

U.S. PATENT DOCUMENTS

| | | | |
|---|---|---|---|
| 5,617,417 A | | 4/1997 | Sathe et al. |
| 5,764,740 A | * | 6/1998 | Holender ................. 379/112.05 |
| 5,809,070 A | | 9/1998 | Krishnan et al. |
| 6,002,670 A | | 12/1999 | Rahman et al. |

(Continued)

FOREIGN PATENT DOCUMENTS

| | | |
|---|---|---|
| CN | 1897492 A | 1/2007 |
| EP | 0910195 A2 | 4/1999 |
| WO | 2006095273 A1 | 9/2006 |
| WO | 2006100610 A1 | 9/2006 |

OTHER PUBLICATIONS

Canadian Intellectual Property Office, Office Action dated Apr. 14, 2014, issued on Canadian Patent Application No. 2,743,548.

(Continued)

*Primary Examiner* — John Pezzlo
(74) *Attorney, Agent, or Firm* — Norton Rose Fulbright Canada LLP

(57) ABSTRACT

The invention discloses a network aggregation system, apparatus and method for creating aggregated network connections to provide high availability and increased throughput where the plurality of network connections may possess diverse physical and logical characteristics. Increased throughput on the aggregated network connection equals the sum of the available throughput on the aggregated network connections. Aggregation is performed in a transparent fashion, independent of any physical or logical characteristics of the individual connections. Network connectivity over the aggregated connection is managed such that the loss or gain of connectivity in an individual connection among the aggregated group does not result in the loss of data from the data stream aggregation device.

21 Claims, 4 Drawing Sheets

(56) References Cited

U.S. PATENT DOCUMENTS

| | | | |
|---|---|---|---|
| 6,262,976 B1 * | 7/2001 | McNamara | 370/254 |
| 6,621,859 B1 | 9/2003 | Bell et al. | |
| 6,778,495 B1 | 8/2004 | Blair | |
| 7,167,860 B1 * | 1/2007 | Black et al. | 705/35 |
| 7,177,284 B2 | 2/2007 | Peleg et al. | |
| 7,630,412 B2 | 12/2009 | Wright et al. | |
| 7,646,708 B2 * | 1/2010 | McGee et al. | 370/229 |
| 7,843,843 B1 * | 11/2010 | Papp et al. | 370/252 |
| 2002/0114276 A1 | 8/2002 | Basturk | |
| 2004/0213386 A1 | 10/2004 | Gupta | |
| 2005/0027870 A1 * | 2/2005 | Trebes | 709/227 |
| 2005/0030974 A1 | 2/2005 | Wright et al. | |
| 2006/0098573 A1 | 5/2006 | Beer et al. | |
| 2006/0176900 A1 | 8/2006 | Liu et al. | |
| 2006/0215689 A1 | 9/2006 | Liu et al. | |
| 2008/0075111 A1 | 3/2008 | Hu et al. | |
| 2008/0080371 A1 | 4/2008 | Liu et al. | |
| 2009/0182874 A1 * | 7/2009 | Morford et al. | 709/224 |
| 2010/0046536 A1 | 2/2010 | Wright et al. | |
| 2011/0081955 A1 * | 4/2011 | Lange et al. | 463/6 |

OTHER PUBLICATIONS

State Intellectual Property Office, Office Action dated Aug. 23, 2013, issued on Chinese Patent Application No. 200980149872.1 (english translation provided).

State Intellectual Property Office, Office Action dated Apr. 30, 2014, issued on Chinese Patent Application No. 200980149872.1 (english translation provided).

European Patent Office, Extended European Search Report dated Jan. 3, 2013, issued on European Patent Application No. 09825684.5.

Mushroom Networks, Inc.; Mushroom Networks; http://www.mushroomnetworks.com/product.aspx?product_id=1000&tab=features; p. 1-2; 2004-2008.

Internet Engineering Task Force; The PPP Multilink Protocol; http://www.ietf.org/rfc/rfc1990.txt?number=1990; Aug. 1, 1996.

United States Patent and Trademark Office, Office Action Summary dated Apr. 9, 2010, issued on U.S. Appl. No. 12/269,439.

United States Patent and Trademark Office, Office Action Summary dated Dec. 7, 2010, issued on U.S. Appl. No. 12/269,439.

United States Patent and Trademark Office, Office Action Summary dated Jun. 23, 2011, issued on U.S. Appl. No. 12/269,439.

* cited by examiner

SYSTEM, APPARATUS AND METHOD FOR PROVIDING AGGREGATED NETWORK CONNECTIONS

This application is a continuation of U.S. patent application Ser. No. 12/269,439 filed Nov. 12, 2008 now U.S. Pat. No. 8,155,158.

FIELD OF THE INVENTION

The present invention relates generally to communications and, in particular, to aggregating dissimilar communications links such as Cable, DSL, T1, or Metro Ethernet.

BACKGROUND

While the capacity of network connections has increased since the introduction of dial up, high speed connectivity is not ubiquitous in all regions. Even with the addition of various connection options such as DSL (Digital Subscriber Line) and their variants (VDSL, etc) as well as Cable based broadband, the majority of consumers are unable to use the theoretical maximum throughput. The inability to achieve theoretical maximum throughput from a circuit is a result of the inversely proportional relationship between throughput and distance over various types of network connections such as Cable, DSL.

Network connection aggregation is a method by which multiple network connections are grouped to provide a single logical aggregated network connection. This provides higher throughput for network applications with the added benefit of high availability/redundancy. Each network connection in the aggregate provides a percentage of the bandwidth to the logical network communication link independent of the characteristics (latency, bandwidth capacity, provider and provider architecture) of the underlying network communication link.

Although prior ITU recommendations G.998.1 (ATM-based multi-pair bonding) G.998.2 (Ethernet-based multi-pair bonding) and G.998.3 (Multi-pair bonding using time-division inverse multiplexing) speak of various bonding techniques applying to DSL links, there is generally no discussion regarding an architectural approach to aggregating dissimilar network connections to provide a single (logical) aggregated network connection. There are no provisions made for independence from physical and logical characteristics of the aggregated network connections or for high availability and lossless network failure within the aggregated connection.

U.S. Pat. No. 6,621,859 to Bell ("Bell") teaches the idea of combining different network connections to provide bi-directional data communication technology. The combined cable and DSL modem disclosed by Bell employs unidirectional data transmission over the existing cable plant for downstream data communication, and unidirectional DSL data transmission over the existing wire pairs employed by the telecommunications network in a single data communications loop. Bell requires private network connections between an internet service provider and a client side cable and DSL provider. Bell also does not teach splitting sessions and distributing the data packets (i.e. aggregating) over different network connections.

U.S. patent application 20040213386 to Gupta ("Gupta") discloses a communications device, method and service that integrate broadband and dial-up internet access. A modem is provided that combines both broadband and dial-up connectivity in a single device. The modem includes an auto-sense procedure for switching between the two types of connections. Gupta, however, serves a single connection at any given time. Gupta does not teach splitting of sessions into data packets and distribution of data packets over different, aggregated, network connections.

U.S. patent application 20080080371 to Liu ("Liu") teaches a macro-spatial network multiplexing. Liu discloses dividing data from a particular application to be transmitted over different network connections. A communication module can transmit signals to/from a plurality of base stations. In this way a plurality of network connections may be leveraged for the client. Liu teaches that packets formed from the data are transmitted via a first network connection and a second network connection such that the packets transmitted via the first network connection do not match the packets transmitted over the second network connection, thereby improving bandwidth available to the client. Liu also teaches that a determination is made as to which of a plurality of network connection devices are to be used to transmit the data based on one or more considerations. For example the determination may be made based on a quality of service (QoS) specified for a particular data, available bandwidth of network connection, cost, etc. The packets include headers that identify a particular order which may be used to reorder data included in the packets after transmittal. However, Liu does not disclose bonding having bandwidth aggregation with diversity. The apparatus of Liu is restricted to directing traffic among networks and allowing traffic to be distributed amongst different networks.

U.S. patent application 20060176900 to Liu ("Liu 2") discloses a de-centralized architecture for bonding communication links, such as ATM-based bonding of DSL lines such as Asymmetric DSL (ADSL), Very high speed DSL (VDSL), or more generally any DSL (xDSL) lines. Liu 2, however, does not teach aggregating cable, ADSL, T1, wireless or dialup.

U.S. patent application 20080075111 to Feng ("Feng") discloses a bonding device to allow transmission of a single or unified data stream over two or more different telecommunication links. The two or more telecommunication links are DSL. Feng does not teach aggregating cable and DSL.

U.S. Pat. No. 5,809,070 to Krishnan ("Krishnan") teaches methods and apparatus for achieving high data transmission rates using multiple, simultaneous, parallel connections. Two or more modems are coupled to a host computer. An operating system component controls the modems either as independent communications channels, or for high speed data transmissions, and "combines," or "bonds" multiple Public Switched Telephone Network-type connections together to create a high speed data link. This is accomplished by splitting a high speed data stream into multiple lower speed data streams and transmitting each lower speed data stream via a low speed modem and PSTN connection. Krishnan does not disclose a method to enable aggregating network connections with dissimilar characteristics and does not disclose a method for aggregating connections using in always-on technique.

Therefore, there remains a need for a connection aggregation technology that provides enhanced high availability mechanisms coupled with high throughput while maintaining independence and transparency to the underlying network connection characteristics whether logical, such as latency, transport protocol or physical, such as provider architecture, transport mechanism, etc.

SUMMARY OF THE INVENTION

In one aspect of the present invention, an apparatus is provided for managing the transfer of communication traffic over one or more diverse network connections is provided, the apparatus comprising a network aggregation means operable to configure the one or more diverse network connections as an aggregated group defining an aggregated connection having a transfer rate defined by an aggregate group transfer rate associated with the available transfer rates of the one or more diverse network connections, the network aggregation means being further operable to transfer communication traffic between a further connection and the aggregated connection.

In another aspect of the present invention, a method is provided for managing the transfer of communication traffic over one or more diverse network connections is provided, the method comprising the steps of: (a) by means of a network aggregation device, configuring the one or more diverse network connections as an aggregated group thereby defining an aggregated connection having a transfer rate defined by an aggregate group transfer rate associated with the available transfer rates of the one or more diverse network connections; and (b) transferring communication traffic between a further network connection and the aggregated connection.

In a still other aspect of the invention a system is provided, the system comprising: one or more components configured to manage the transfer of communication traffic over one or more diverse network connections, the one or more components defining, including or being linked to a network aggregation means operable to configure the one or more diverse network connections as an aggregated group defining an aggregated connection having a transfer rate defined by an aggregate group transfer rate associated with the available transfer rates of the one or more diverse network connections, the network aggregation means being further operable to transfer communication traffic between a further connection and the aggregated connection.

BRIEF DESCRIPTION OF THE DRAWINGS

Examples of embodiments of the invention will now be described in greater detail with reference to the accompanying drawings, in which.

DETAILED DESCRIPTION

Figure 1:
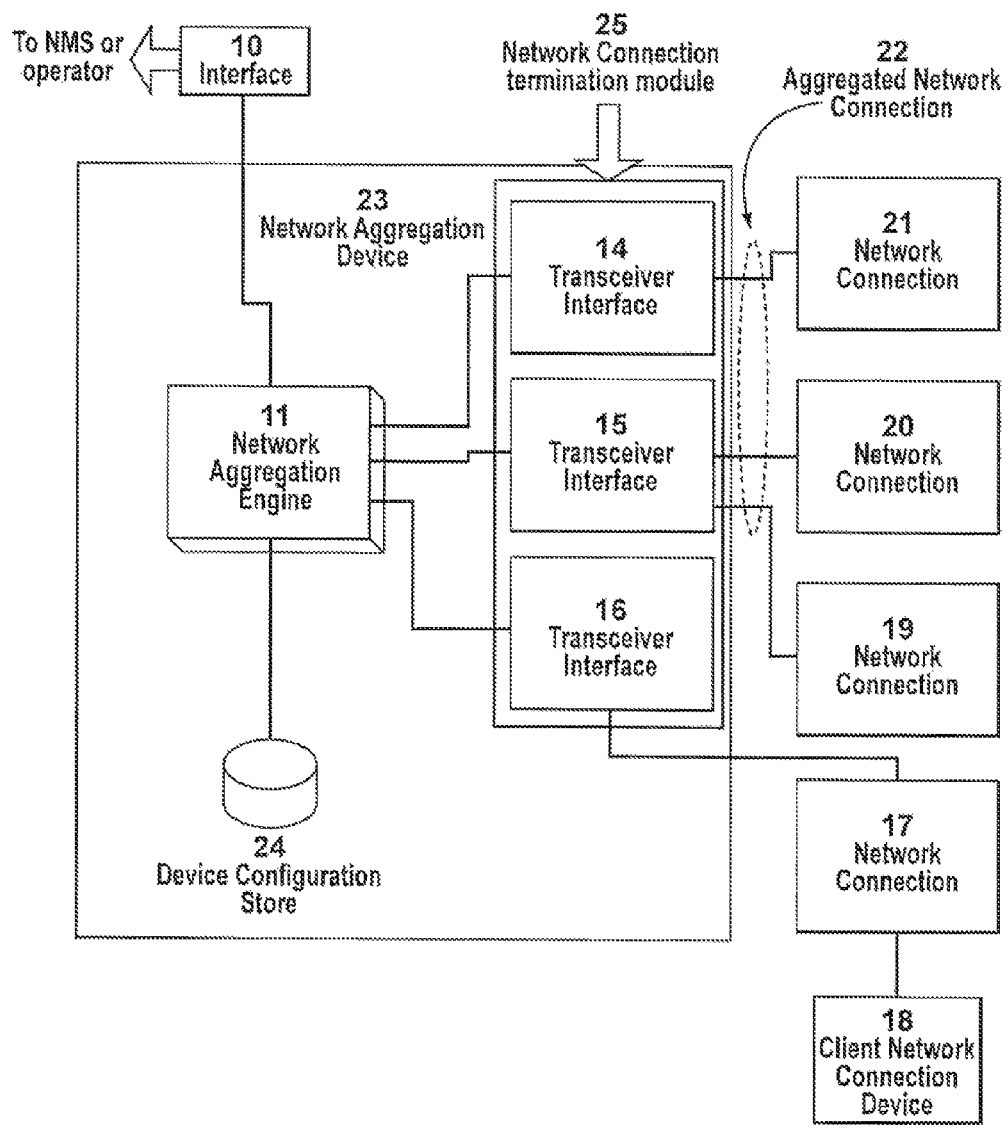
FIG. 1 is a block diagram of a communication device incorporating a particular embodiment of the invention, demonstrating the device as an aggregation means on the client/CPE side of a network connection.

In one aspect, the invention provides a system and architecture for aggregating multiple network access connections from similar or diverse carriers to create a new aggregated connection that accommodates greater speed and high availability characteristics.

The architecture of the present invention is best understood as a centralized architecture for aggregating network connections, broadband or otherwise. Diverse network connections are aggregated into a virtual (logical) connection that provides higher throughput as well as independence of the network characteristics of the constituent (physical) network. Aggregation may be performed to a given Customer Premises Equipment terminal.

For instance, in one example of the implementation of the present invention a Metro Ethernet 10 Mbps (E10) link and a T1 (DS1) link are aggregated in accordance with the invention as described below, in order to provide higher fault tolerance and improved access speeds. The aggregation of diverse carriers in accordance with the present invention extends to any broadband network connection including Digital Subscriber Line (DSL) communications links, Data over Cable Service Interface Specification (DOCSIS), Integrated Services Digital Network, Multi protocol Label Switching, Asynchronous Transfer Mode (ATM), and Ethernet, etc.

According to one aspect of the invention, an apparatus is provided for managing transfer of communication traffic over diverse network connections aggregated into a single autonomous connection, independent of the various underlying network connections. The apparatus may include a network aggregation device and an aggregation engine. The network aggregation device may be adapted to configure a plurality of network connections, which transfers communication traffic between a further network connection and the plurality of network connections, as an aggregated group for providing a transfer rate on the further communication link, and to allocate to the aggregate group a rate of transfer equal to the total available transfer rate of the underlying networks. The aggregation engine may be adapted to manage the distribution of communication traffic received both to and from a plurality of network connections, establishing newly formed aggregated network connections. The aggregation engine may be implemented in software for execution by a processor or in hardware, in a manner that is known to those skilled in the art.

In accordance with this aspect of the present invention, a plurality of diverse network connections may be aggregated to create an aggregated network connection. The diversity of the network connections may be a result of diversity in provider networks due to the usage of different equipment vendors, network architectures/topologies, internal routing protocols, transmission media and even routing policies. These diversities may lead to different network connections with different latencies and/or jitter on the network connection. Also, variation within transmission paths in a single provider network may lead to latency and/or jitter variations within a network connection.

Latency and jitter typically affect all data communication across the network connection. Latency, as is known to those skilled in the art, is the round-trip time for a transmission occurring end-to-end on a network connection. Jitter, as is known to those skilled in the art, is the variance in latency on a network connection for the same data flow. High latency and jitter typically have a direct and significant impact on application performance and bandwidth. Applications such as VOW, and video delivery are typically highly sensitive to jitter and latency increases and can degrade as they increase.

Transparent aggregation of a plurality of network connections in an aggregated network connection requires the management of data transmitted over the aggregated connection by the aggregation engine and received from the aggregation traffic termination engine. In one aspect of the present invention, transparent aggregation does not require any configuration by a network provider. The aggregation engine and the aggregation traffic termination engine may manage data transmission such that the variable path speeds and latencies on the plurality of network connections do not affect the application data transmitted over the aggregated network connection. The network aggregation engine and the aggregation traffic termination engine may handle sequencing and segmentation of the data transmitted through the aggregated connection to transparently deliver application data through the aggregated connection with minimal possible delay while ensuring the ordered delivery of application data.

In one aspect of the invention, the network aggregation engine provides a newly aggregated network connection with a capacity equal to the sum of the configured maximum throughput of the network connections.

The aggregation engine and an aggregation traffic termination engine (further explained below) handle the segmentation of packets as required in confirmation with architectural specifications such as Maximum Segment Size (MSS) and Maximum Transmission Unit of the underlying network connections. The network aggregation device is operable to handle assignment of sequence identifiers to packets transmitted through the aggregated network connection for the purpose of maintaining the ordering of transmitted data units over the aggregated network connection.

In a further aspect of the invention, the network connection device includes or is linked to a connection termination device, and a plurality of fixed or hot swappable transceivers for transmitting communication traffic on respective sets of network connections, for the purpose of configuring a plurality of network connections as an aggregated connection or the management of multiple aggregated network connections and providing access to the aggregated network connection for any network communications traversing the device.

In the present specification, routing protocols or route selection mechanisms described are intended only to provide an example but not to limit the scope of the invention in any manner.

FIG. 1 is a block diagram of a communication device incorporating a particular embodiment of the invention, demonstrating the device acting as a client.

As shown in FIG. 1, the network element/network aggregation device (also referred to in this disclosure simply as the "device" or the "network aggregation device") 23 includes (in this particular embodiment shown for illustration) a network connection termination module 25 that includes representative transceiver interfaces 14, 15 and 16. Each transceiver interface 14, 15 and 16 represents an interface to a physical communication medium through which communications may be established to network connections.

A possible implementation of the network aggregation device may use a single or multiple chassis with slots for multiple network connection termination modules and multiple network aggregation engine modules. The multiple network connection termination modules may be grouped by protocol specific or medium specific transceiver/interfaces.

The network aggregation engine 11 may handle the configuration of the network aggregation device and all related interactions with external inputs. A device configuration store 24 may provide persistent data storage for device configuration information such as a network aggregation policy.

The network aggregation engine 11 may handle queries from external sources, such as configuration parameters a network management protocol such as Simple Network Management Protocol, for example. The interface 10 may be a protocol agent and may provide for communication with a Network Management System (NMS) or operator system for configuration of the aggregation engine by the definition of an aggregation policy. Control and management information may be transferred between the network aggregation device 23 and the NMS or operator system through the interface 10 via any available or specifically designated network connection 19, 20, 21 and 17 through any transceiver interface 14, 15 and 16.

In accordance with an aspect of the present invention, multiple network connections may be combined to form an aggregated network connection 22, as disclosed in further detail herein. Each individual network connection may be configured with a maximum communication traffic rate, which could be expressed as a bit rate in bits per second.

The network aggregation engine 11 may be implemented in software for execution by a processor in the network aggregation device 23, or in hardware such as by means of a Field Programmable Gate Array (FPGA) or other integrated circuit, or some combination thereof. The network aggregation engine 11 may be implemented in a distributed manner by distributing aggregation engine intelligence to the network connection termination module 25, in a manner that is known.

The network aggregation engine 11 may receive traffic from client network connection device 18 through a network connection 17 provided through a transceiver interface 16. The client network connection device 18 may be any device including, without limitation, a router, switch, or media converter that is capable of providing termination for a single or multiple client nodes, where nodes are any devices capable of connecting to a network irrespective of protocol or interface specificity. In various embodiments, traffic may be received over multiple network connections through a single or multiple transceiver interfaces. The network aggregation engine 11 may accept all traffic from the client network connection, may provide encapsulation and segmentation services for the traffic for transmission through the aggregated network connection 22, and may transmit it over any of the network connections 19, 20 and 21 through any of the transceiver interfaces 14, 15 and 16. The network aggregation engine 11 may handle segmentation in a manner that avoids the fragmentation of aggregated communication traffic received through the client network connection device 18, when transmission occurs over the aggregated network connection 22 through any of the network connections 19, 20 and 21, by ensuring that the length of a packet/frame transmitted over any of the network connections 19, 20 and 21 is less than or equal to the configured or detected frame length for the respective connections in the aggregated network connection 22.

The network aggregation engine 11 may poll the state of network connections 19, 20 and 21, for example as per configured intervals stored in the device configuration store 24, to ensure that all network connections configured in an aggregated group are within configured acceptable tolerances. If a network connection 19, 20, and 21 exceeds acceptable tolerance values for any of the polled parameters, the network aggregation engine 11 may remove the network connection 19, 20, and 21 from within the aggregated network connection 22 without removing it from the polled network connections list. By leaving the removed network connection 19, 20, and 21 in the polled network connection list, the network aggregation engine 11 may aggregate the network connection into the aggregated network connection 22 once it has come back within acceptable tolerance values. This may ensure that a network connection may change states between residing in an aggregated network connection 22 or not, without the intervention of an external system or input. The network aggregation engine 11 may handle notifications to all end points configured within the device configuration store 24 with internal events such as changes in network connection state, threshold violations on configured thresholds for any number of configurable variables for any object within or connected to the network aggregation device 23. The network aggregation engine 12 may also handle events such as changes in the state of a network connection 19, 20, and 21 included in the aggregated connection, changes in latency of a network connection included in the aggregated network connection 22, scheduling changes, event logging, and other events.

Figure 2:
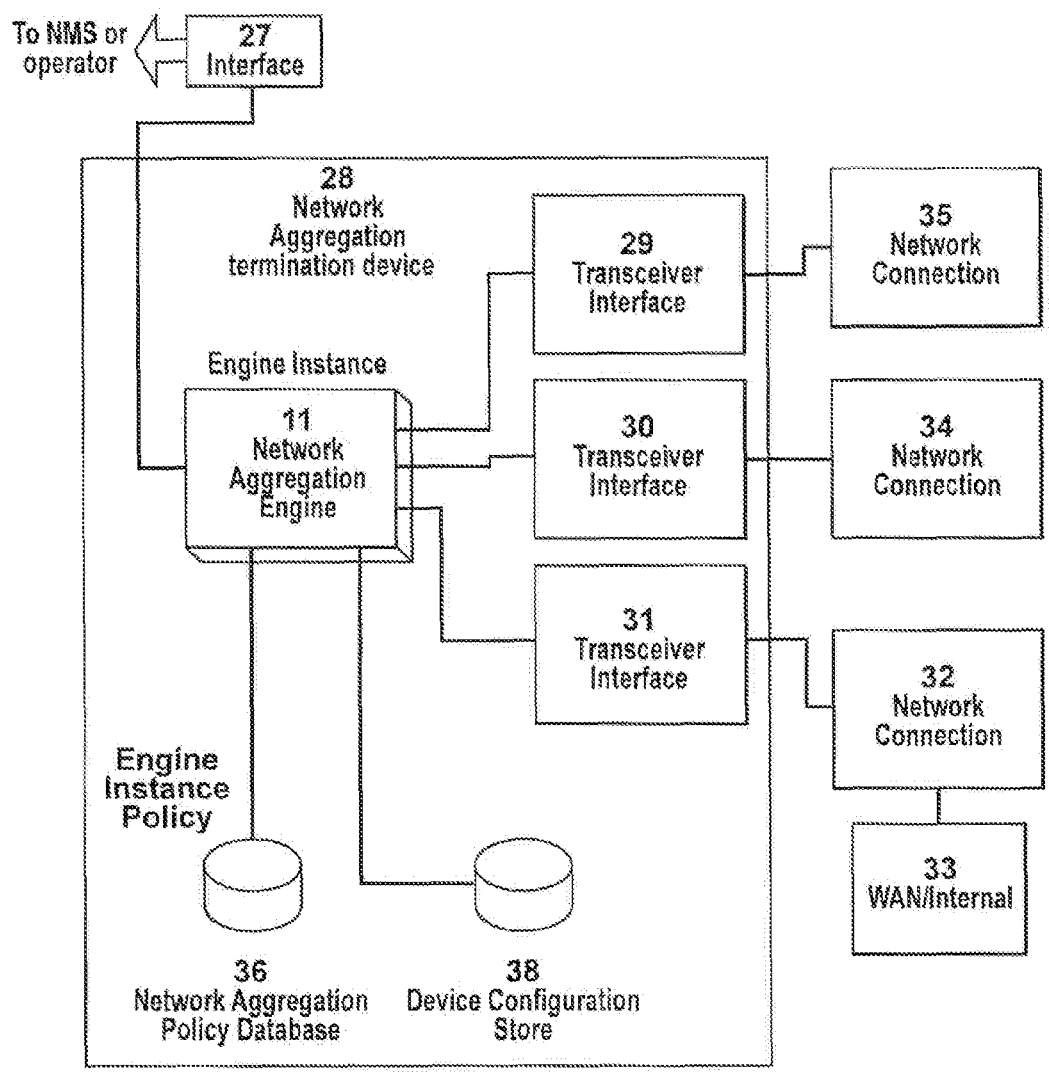
FIG. 2 is a block diagram of a communication device incorporating a particular embodiment of the invention, demonstrating the device as an aggregation means on the server/concentrator side of a network connection.

FIG. 2 is a block diagram of a communication device incorporating a particular embodiment of the invention, demonstrating the device acting as a server/concentrator.

The network aggregation engine 11 may provide access to a network aggregation policy database 36 which stores configuration information related to the various aggregated network connections that terminate on the aggregated network connection device 28. The network aggregation termination device 28 may be implemented in such a manner that each aggregated network connection defined in the network aggregation policy database 36 is handled by its own virtual instance, the use of which enables termination of each aggregated network connection from multiple customer premises equipment (CPE).

Figure 3:
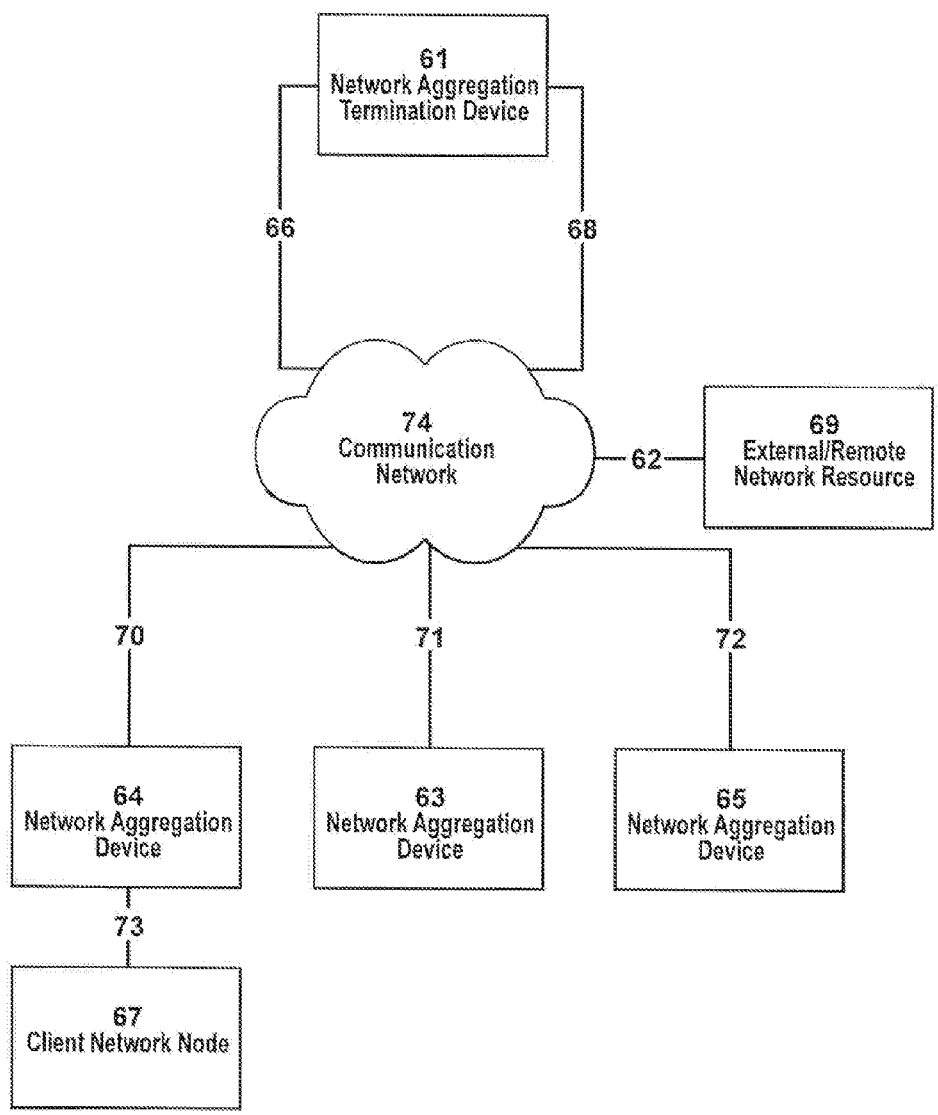
FIG. 3 is a block diagram of a communication network incorporating a particular embodiment of the invention, demonstrating the device as an aggregation means on both the client/CPE side and server/concentrator side of a network connection.

FIG. 3 is a block diagram of a communication network incorporating a particular embodiment of the invention, demonstrating the function of the device acting as a client/CPE and server/concentrator.

In accordance with a particular embodiment of the invention, aggregated network connections 70, 71 and 72 may be built by network aggregation devices 63, 64 and 65, which terminate to a single aggregated network connection termination device 61 through network connections 66 and 68 as their endpoint. The aggregated network connection termination device 61 may access external communications networks through network connections 66 and 68 to access external/remote network resource 69. Access to external communications networks may be provided by the aggregated network connection termination device 61 by using either network connection 66 or 68 through the use of a routing protocol, such as Border Gateway Protocol (BGP), Open Shortest Path (OSPF), or through the use of simpler mechanisms such as load sharing over multiple static routes within the communication network 74 that acts as the valid next-hop for the aggregated network connection termination device 61.

Aggregated network connections 70, 71 and 72 may provide access to client network nodes 67 connected to the network aggregation devices 63, 64 and 65 through the aggregated network connections 70, 71 and 72 to communications networks 74 accessible by the aggregated network connection termination device 61.

A client network node 67 may request data provided by an external/remote network resource 69 accessible through a communication network 74. This request for the external/remote network resource may be routed over the network connection 73 providing access from the client network node 67 over the aggregated network connection 70 to its end point which is the aggregated network connection termination device 61. This may be done through the communication network 74 through the network connection 66 into the aggregated network connection termination device 61. Any data sent by the external/remote network resource 69 may be routed back through the aggregated network connection termination device.

A particular embodiment of this invention may use the Internet as the communication network 74 referenced in FIG. 3. However, the communication network 74 may alternatively be built by multiple sub-networks created through the use of multiple network aggregation devices 63, 64 and 65 with aggregated network connection termination device 61 end points through multiple network connections 66 and 68.

Figure 4:
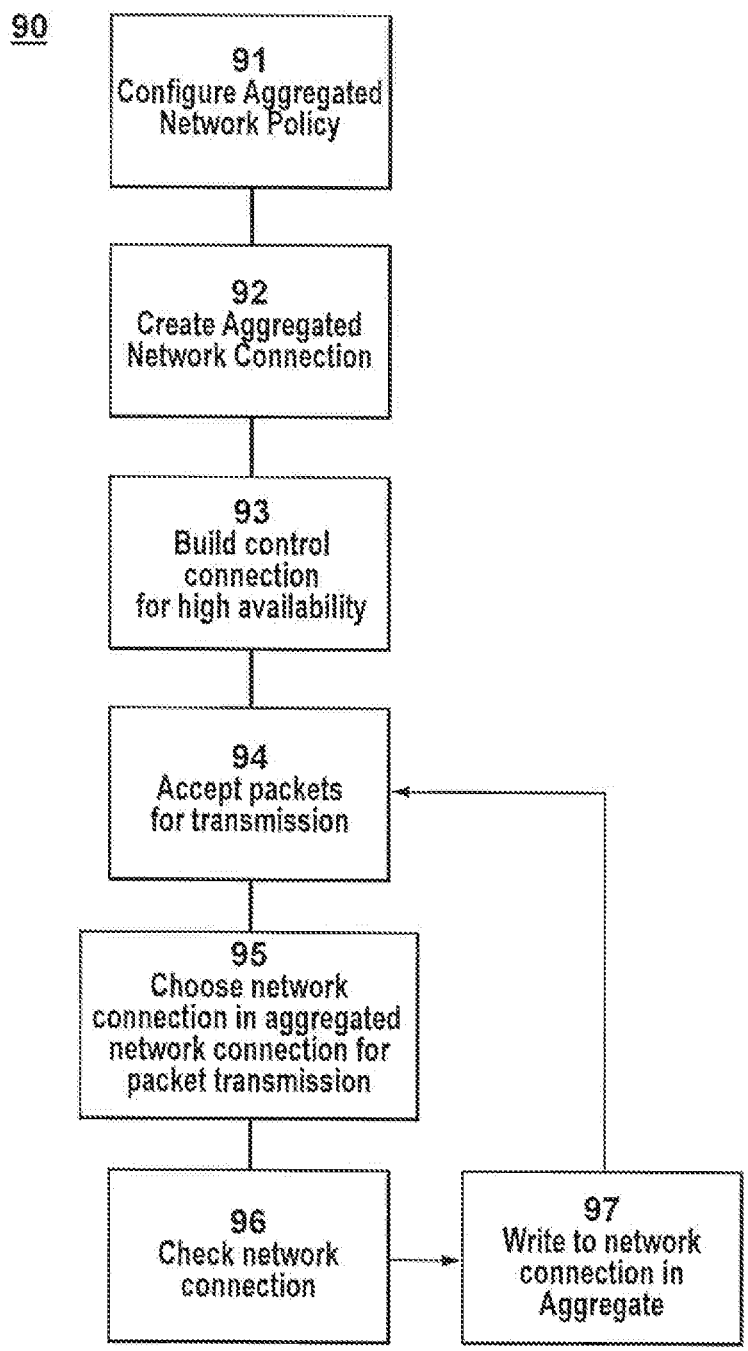
FIG. 4 is a flow diagram of a method of providing redundancy and increased throughput through a plurality of network connections in an aggregated network connection.

A further aspect of the invention relates to the provisioning of high availability over the aggregated network connection by the network aggregation engine 11. FIG. 4 illustrates a method of providing redundancy and increased throughput through a plurality of network connections in an aggregated network connection. The method 90 may begin with a step of configuring a plurality of network connections 91 through the creation of a network aggregation policy to form 92 the aggregated network connection. The aggregated network connection may be initialized as per the network aggregation policy. Control connections may be created 93 for the plurality of network connections configured as part of the aggregated connection to allow the aggregation engine 11 to manage the membership of a network connection within the aggregated connection. The network aggregation engine 11 may accept packets for transmission 94 over the aggregated network connection 22. The network aggregation engine 11 may choose a network connection 95 among the group of network connections configured 91 in the aggregate in the stored aggregation policy for transmission of the current packet being transmitted. The choice of network connection for transmission of the current packet may be specified within the aggregation policy and may take into account data provided by the control connection built at 94.

According to one embodiment of the invention, a non-responsive network connection may be easily detected when using latency and packet loss as a measure. The mechanism for detecting 96 and adapting to 97 the network connection change within an aggregated network connection may be implemented within the data transmission routine in the aggregation engine 11 or as a separate process in parallel to the transmission routine in the aggregation engine 11 to allow for further flexibility in provisioning redundancy within the aggregated network connection.

Since this may occur on a per packet basis as opposed to on a per stream basis, a single non-responsive network connection may not affect the aggregated network connection and may allow data transmission to continue regardless of the individual states of network connections so long as a single network connection within the aggregated network connection is available for data transmission.

The invention claimed is:

1. A network aggregation apparatus comprising:
at least one network aggregation device configured for:
configuring a plurality of diverse network connections as at least one aggregated group, each aggregated group creating an aggregated network connection that is a logical connection of the aggregated diverse connections;
configuring at least one of the at least one aggregated groups such that the grouped diverse connections in each respective configured group operated within tolerance values based on at least one network aggregation policy such that the respective logical connection has a total communication traffic throughput that is a sum of available communication traffic throughputs of the aggregated group of diverse network connections and
routing and managing bi-directional transmissions over the aggregated network connection;
wherein the plurality of diverse network connections include at least one of dissimilar network connections, and network connections provided by a plurality of diverse network carriers; at least two of the diverse network connections having dissimilar network characteristics, the dissimilar network characteristics including bidirectional transfer rates and latencies;

wherein the logical connection is utilizable for a transfer of communication traffic bidirectionally on any of the diverse network connections without any configuration for the dissimilar network connections or by the diverse network carriers.

2. The apparatus of claim 1, wherein at least one of the at least one network aggregation device is configured to function as a network aggregation termination device at a termination or endpoint of one or more of the aggregated network connections, the network aggregation termination device configured to access at least one internal network resource and at least one external or remote network resource; and wherein the at least one network aggregation policy includes configuration information related to at least one of the aggregated network connections that terminate at the network aggregation termination device;

wherein the network aggregation termination device is configured to utilize the information to detect one or more of the plurality of diverse network connections that are non-responsive and to adjust at least one of the aggregated network connections to maintain availability of transmission despite such non-responsiveness.

3. The apparatus of claim 2, wherein at least one of the external or remote resources are accessible by the aggregated network connection device in accordance with at least one of the following: through one or more external communications networks; or by use of a routing protocol.

4. The apparatus of claim 1, wherein the at least one network aggregation device is configured so that each aggregated network connection is handled by its own virtual instance to thereby enable termination of one or more of the aggregated network connections.

5. The apparatus of claim 4, wherein one or more of the aggregated network connections are from multiple customer premises.

6. The apparatus of claim 5, wherein the network aggregation device is configured to create a polled network connections list.

7. The apparatus of claim 6, wherein the network aggregation device is configured to remove from the aggregated network connection one or more of the plurality of diverse network connections that are not within the configured tolerances, wherein the removed one or more network connections remain on the polled network connections list.

8. The apparatus of claim 7, wherein upon one of the removed network connection returning to within the configured tolerances, the network aggregation engine re-aggregates the network connection returning to within the configured tolerances into the aggregated network connection.

9. The apparatus of claim 1, wherein the at least one network aggregation device is configured to poll the state of at least one of the network connections to ensure that all network connections in the aggregated network connection are within configured tolerances.

10. The apparatus of claim 1, wherein the network aggregation device is configured to route notifications to all endpoints of the aggregated network connection.

11. The apparatus of claim 1, wherein each aggregated network connection provides access to at least one of the following: at least one client network node connected to network aggregation devices; and at least one communication network accessible by way of the aggregated network connection device.

12. The apparatus of claim 11, wherein at least one of the client network nodes requests data provided by the at least one external or remote network resource, and routes data through the aggregated connection device at the endpoint of the aggregated network connection.

13. The apparatus of claim 1, wherein the plurality of diverse network connections includes at least one of the following: the Internet; multiple sub-networks created through multiple network aggregation devices; a private WAN; and point-to-point private connections.

14. The apparatus of claim 1, wherein the apparatus comprises at least one aggregated network connection server/concentrator that is connected to two or more network aggregation client devices, wherein the aggregated network connection server/concentrator is configured to aggregate two or more aggregated network connections configured by two or more network aggregation client devices, so as to enable one to many network connections for each of the network aggregation client devices.

15. The apparatus of claim 14, wherein the aggregated network connection server/concentrator includes a network aggregation termination device that is linked to a network aggregation policy database that includes configuration information related to one or more of the aggregated network connections, and the network aggregation termination device is configured to utilize the information to detect one or more of the plurality of diverse network connections that are non-responsive and to adjust one or more or the aggregated network connections to maintain availability of transmission despite such non-responsiveness.

16. A method comprising:
configuring a plurality of diverse network connections as at least one aggregated group, each aggregated group creating an aggregated network connection that is a logical connection of the aggregated diverse network connections;

routing and managing bi-directional transmissions over the aggregated network connection between at least one network aggregation device and a network aggregation termination device;

detecting whether one or more of the plurality of diverse network connections are non-responsive based on at least one network aggregation policy;

adjusting at least one of the aggregated network connections to maintain availability of transmission;

polling the state of one or more network connections to ensure that all network connections in the aggregated network connection are within configured tolerances;

creating a polled network connections list;

removing one or more of the plurality of diverse network connections that are not within configured tolerances in the aggregated network connection, where the removed one or more network connections remain on the polled network connections list; and re-aggregating at least one removed network connection into the aggregated network connection upon the at least one removed network connection returning to within configured tolerances.

17. The method of claim 16, further comprising configuring the aggregated network connection device so that each aggregated network connection is handled by its own virtual instance to thereby enable termination of one or more of the aggregated network connections.

18. The method of claim 16, further comprising routing notifications to all endpoints of the aggregated network connection.

19. The method of claim 16, further comprising:
accessing, via at least one of the aggregated network connections, at least one of the following: at least one client network node connected to network aggregation devices; and at least one communication network accessible through the aggregated network connection device;

wherein the at least one client network node requests data provided by an external or remote network resource and routes data through the aggregated connection device at the endpoint of the aggregated network connection.

20. A non-transitory computer readable medium comprising instructions executable by an apparatus to:

configure a plurality of diverse network connections as at least one aggregated group, each aggregated group creating an aggregated network connection that is a logical connection of the aggregated diverse network connections;

route and manage bi-directional transmissions over the aggregated network connection between at least one network aggregation device and a network aggregation termination device;

detect whether one or more of the plurality of diverse network connections are non-responsive based on at least one network aggregation policy;

adjust at least one of the aggregated network connections to maintain availability of transmission;

poll the state of one or more network connections to ensure that all network connections in the aggregated network connection are within configured tolerances;

create a polled network connections list;

remove one or more of the plurality of diverse network connections that are not within configured tolerances in the aggregated network connection, where the removed one or more network connections remain on the polled network connections list; and re-aggregate at least one removed network connection into the aggregated network connection upon the at least one removed network connection returning to within configured tolerances.

21. A system comprising one or more components configured to:

configure a plurality of diverse network connections as at least one aggregated groups, each aggregated group creating an aggregated network connection that is a logical connection of the aggregated diverse network connections;

route transmissions over the aggregated network connection;

access one or more internal network resources or one or more external/remote network resources through an aggregated network connection device being at the termination or endpoint of one or more aggregated network connections;

store configuration information related to aggregated network connections that terminate on the aggregated network connection device in a network aggregation policy database that is accessible by a network aggregation engine configured to:

determine whether one or more network connections are non-responsive based on the configuration information; and adjust the aggregated network connection to maintain availability of transmission;

poll the state of one or more network connections to ensure that all network connections in the aggregated network connection are within configured tolerances;

create a polled network connections list;

remove one or more of the plurality of diverse network connections that are not within configured tolerances in the aggregated network connection, where the removed one or more network connections remain on the polled network connections list; and Re-aggregate at least one removed network connection into the aggregated network connection upon the at least one removed network connection returning to within configured tolerances.

* * * * *